United States Patent [19]

Smith et al.

[11] 4,137,279

[45] Jan. 30, 1979

[54] COPOLYMERS OF POLYCAPROLACTONE DERIVATIVES AND ETHYLENICALLY UNSATURATED MONOMERS

[75] Inventors: Oliver W. Smith, South Charleston; Joseph V. Koleske, Charleston, both of W. Va.

[73] Assignee: Union Carbide Corporation, New York, N.Y.

[21] Appl. No.: 864,754

[22] Filed: Dec. 27, 1977

[51] Int. Cl.$^2$ .............................................. C08L 67/06
[52] U.S. Cl. .................................. 260/861; 260/830 R; 260/830 TW; 260/851; 260/855; 260/856; 260/872; 260/873; 260/875; 260/884; 260/885; 260/885

[58] Field of Search ............ 260/861, 873, 875, 830 R

[56] References Cited

U.S. PATENT DOCUMENTS

| 2,890,197 | 6/1959 | Phillips et al. .................... 260/45.4 |
|---|---|---|
| 3,027,357 | 3/1962 | Stickle ................................. 526/3 C |
| 3,169,945 | 2/1965 | Hostetter et al. ................ 260/874 X |
| 3,408,421 | 10/1968 | Kurka ................................. 260/830 |
| 3,511,792 | 5/1970 | Helm et al. ...................... 260/861 X |
| 3,549,586 | 12/1970 | Smith et al. ..................... 260/861 X |
| 3,583,955 | 6/1971 | Holicky et al. .................. 260/861 X |
| 3,668,178 | 6/1972 | Comstock et al. ............. 260/861 X |
| 3,784,586 | 1/1974 | Thomas et al. ..................... 260/861 |

OTHER PUBLICATIONS

*Unsaturated Polyesters: Structures and Properties*, H. V. Boenig, (Elsevier 1964).
*Organic Coating Technology*, H. Payne, (Wiley, 1954), pp. 304-311.
Damusis, *Sealants*, (Reinhold, 1967), pp. 134-135, 274.

*Primary Examiner*—Thomas De Benedictis, Sr.
*Attorney, Agent, or Firm*—Francis M. Fazio

[57] ABSTRACT

Mixtures of the unsaturated maleic anhydride modified adduct of a polycaprolactone polyol and an ethylenically unsaturated monomer are copolymerized. The resulting polymers are useful as coatings or in the production of films and shaped molded articles.

17 Claims, No Drawings

COPOLYMERS OF POLYCAPROLACTONE DERIVATIVES AND ETHYLENICALLY UNSATURATED MONOMERS

BACKGROUND OF THE INVENTION

In recent efforts to produce ink and coating compositions that are essentially free of volatile solvents and that cure at relatively low temperatures there was discovered a new class of polycaprolactone derivatives. These derivatives are the reaction products of a polycaprolactone polyol and an anhydride of a polycarboxylic acid; they are the subject matter of a separate and distinct patent application, whereas this invention pertains to polymers thereof with another ethylenically unsaturated monomer.

SUMMARY OF THE INVENTION

It has now been found that polymers useful in coating or ink compositions or for the production of shaped molded articles can be prepared by the copolymerization of certain polycaprolactone derivatives and ethylenically unsaturated monomers. The polycaprolactone derivatives useful are the reaction products of a polycaprolactone polyol and maleic anhydride; these are adducts having ethylenic unsaturation and a terminal carboxyl group.

DESCRIPTION OF THE INVENTION

The polymers of this invention are produced by the copolymerization of at least one polycaprolactone polyol adduct, which is the reaction product of a polycaprolactone polyol with maleic anhydride, and at least one ethylenically unsaturated monomer polymerizable therewith. The polymers can also be modified with crosslinkers such as the melamine derivatives and the polyepoxides and polyisocyanates.

The polycaprolactone polyol/maleic anhydride adducts or derivatives that are copolymerized with the ethylenically unsaturated monomers are the adducts comprising the reaction product of a polycaprolactone polyol and maleic anhydride. The mixture of reaction products produced can, if desired, subsequently be converted to a water soluble form by reaction with a base. As starting materials for producing the polycaprolactone polyol adducts one can use any of the known homopolymeric or initiated polycaprolactone polyols that are commercially available and that are fully described, for example, in U.S. Pat. No. 3,169,945. As described in this patent the polycaprolactone polyols are produced by the catalytic polymerization of an excess of epsilon-caprolactone and an organic polyfunctional initiator having at least two reactive hydrogen atoms. The polycaprolactone polyols for use herein can be single compounds or mixtures of compounds and either can be used in this invention. The method for producing the polycaprolactone polyols is of no consequence and is shown in U.S. Pat. No. 3,169,945; when an organic functional initiator is used it can preferably be any polyhydroxyl compound. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethyleneoxypropylene) glycols, and similar polyalkylene glycols, either blocked, capped or heteric, containing up to about 40 or more alkyleneoxy units in the molecule, 3-methyl-1,5-pentanediol, cyclohexanediol, 4,4'-methylene-bis-cyclohexanol, 4,4'-isopropylidene bis-cyclohexanol, xylenediol, 2-(4-hydroxymethylphenyl)ethanol, 1,4-butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

In this equation the organic functional initiator is the $R''(OH)_x$ compound and the caprolactone is the

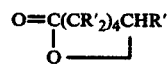

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 25,000. The preferred are the polycaprolactone diol compounds having an average molecular weight of from about 290 to about 20,000 and the polycaprolactone triol compounds having an average molecular weight of from about 300 to about 1,000; these are preferred because of their low viscosity properties. In the formula m is an integer representing the average number of repeating units needed to produce the compound having said molecular weights. The hydroxyl number of the polycaprolactone polyol can be from about 4 to 600, preferably from 6 to 100; and the polycaprolactone polyol can have an average of from 2 to 6; preferably 2 to 4, hydroxyl groups.

Illustrative of polycaprolactone polyols that can be used for the production of the adducts one can mention the reaction products of a polyhydroxyl compound having an average of from 2 to 6 hydroxyl groups with caprolactone. The manner in which these polycaprolactone polyol compositions are produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

| | POLYCAPROLACTONE POLYOLS | | |
|---|---|---|---|
| | Initiator | Average MW of polyol | Average No. of CPL units in molecules |
| 1 | Ethylene glycol | 290 | 2 |
| 2 | Ethylene glycol | 803 | 6.5 |
| 3 | Ethylene glycol | 2,114 | 18 |

-continued

POLYCAPROLACTONE POLYOLS

| Initiator | | Average MW of polyol | Average No. of CPL units in molecules |
|---|---|---|---|
| 4 | Propylene glycol | 874 | 7 |
| 5 | Octylene glycol | 602 | 4 |
| 6 | Decalence glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,398 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 835 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,6-Bis(hydroxyethyl)-benzene | 736 | 5 |
| 27 | Glycerol | 548 | 4. |
| 28 | 1,2,6-Hexanetriol | 476 | 3 |
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

*=Average molecular weight of glycol

The structures of the compounds in the above tabulation are obvious to one skilled in the art based on the information given. The structure of Compound No. 7 is:

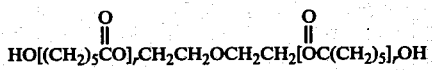

wherein the variable r is an integer, the sum of r + r has an average value of 3.7 and the average molecular weight is 527. The structure of compound No. 20 is:

wherein the sum of r + r has an average value of 6 and the average molecular weight is 1,684. This explanation makes explicit the structural formulas of compounds 1 to 34 set forth above.

The polycaprolactone polyol is reacted with maleic anhydride to produce the polycaprolactone polyol adduct. The amount of maleic anhydride reacted with the polycaprolactone polyol can be an amount sufficient to permit reaction with all of the hydroxyl groups; however, one can use an amount which is insufficient to react with all of the hydroxyl groups present in the polycaprolactone polyol. This amount will vary and can be from 0.1 to 1 anhydride equivalent for each hydroxyl equivalent or group present in the polycaprolactone polyol initially charged to the reaction mixture and is preferably from 0.5 to 1. In a most preferred instance, one anhydride equivalent or anhydride moiety is charged for each hydroxyl equivalent or group initially present in the reaction mixture.

The polycaprolactone polyols are reacted with the maleic anhydride at a temperature of from about 75° to 200° C., preferably from about 100° to 140° C. The time required for reaction will vary depending upon the particular reactants charged, the temperature and the batch size of the reaction mixture, facts which are well known to those skilled in the art. Generally it has been found that a reaction period in the laboratory of from 15 to 45 minutes at from about 125° to 150° C. is adequate to produce the initial water insoluble carboxyl modified polycaprolactone polyol adduct produced by the reaction of these two intermediates. The water insoluble adduct formed at this stage of the reaction is a viscous liquid or waxy solid in most instances. Generally these adducts are water insoluble but solvent soluble.

The water insoluble adducts described stage having molecular weights below about 5,000 readily converted to water soluble form by reaction with a base which can be either an inorganic or an organic base. The preferred bases are the organic amines. The bases that can be used are well known to those skilled in the art and any of the known bases can be used. Illustrative thereof one can mention ammonia, butylamine, morpholine, piperazine, triethylamine, N-methyl diethanolamine, N,N-diethyl ethanolamine, N,N-dimethyl propanolamine, triethanolamine, diethylamine, triisopropanolamine, monoethanolamine, diethanolamine, monoisopropylamine, diisopropanolamine, 2-amino-2-methyl-1-propanolamine, and the like. While any amine can be used, the preferred are the tertiary amines.

The amount of amine or base added is an amount sufficient to neutralize essentially all of the free carboxylic groups in the water insoluble adduct and to take the pH of the reaction mixture to about 6 to 10, preferably from 7 to 9.

Reaction with the amine produces a polycaprolactone polyol maleic anhydride adduct which is predominantly water soluble. This water soluble adduct is eminently suitable for the production of a water borne coating composition. While applicants have not fully established the structures of the adducts present in the reaction product mixture, it has been theorized that the reaction can proceed along the following route; however, the reaction product is a complex mixture of components including unreacted polycaprolactone polyol and the half esters of maleic anhydride when less than one equivalent of anhydride is used per hydroxyl equivalent.

Step 1

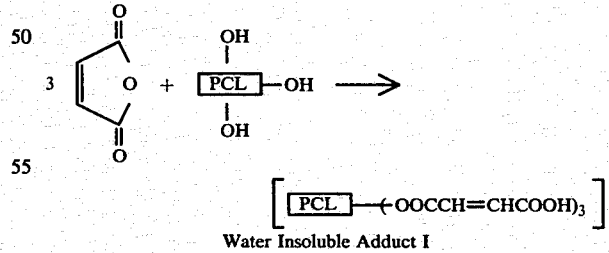

Water Insoluble Adduct I

Step 2

Water Insoluble Adduct I + CH$_3$N(CH$_2$CH$_2$OH)$_2$ ⟶

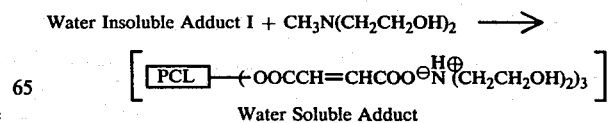

Water Soluble Adduct

In the above, the unit

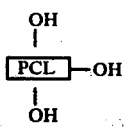

represents a polycaprolactone triol. In some instances, depending upon the amount of anhydride used in Step 1, the amount of water used to dissolve the adduct of Step 2 may be restricted before evidence of insolubilization is noted. While this theoretical explanation is presented, applicants do not intend to be bound by any theory.

In a typical reaction one normally charges a polycaprolactone polyol and the maleic anhydride to a reaction vessel and heats the mixture to a temperature of from about 125° to 175° C. for a period of about 20 to 30 minutes. This produces an unsaturated, water insoluble, carboxyl modified half-ester oligomer or adduct. This water insoluble adduct can then be neutralized with a base or amine at any convenient temperature and there is obtained a water soluble, unsaturated, carboxyl modified oligomer or adduct as previously described.

In the schematics shown above specific ratios and compounds were employed for illustrative purposes only. It is apparent, in view of our complete description, that these can be modified within the ranges disclosed in this application.

The ethylenically unsaturated monomers that are copolymerized with the above-described polycaprolactone polyol/maleic anhydride adducts are those containing at least one polymerizable carbon-to-carbon unsaturated bond. Illustrative of such polymerizable reactants that can be used in the process of this invention are those containing at least one polymerizable carbon-to-carbon unsaturated bond. These compounds are well known and any attempt to list them all would be unnecessary. Illustrative thereof, however, one can mention the unsaturated compounds such as styrene, alpha-chlorostyrene, alphamethylstyrene, allylbenzene, phenylacetylene, 1-phenyl-1,3-butadiene, vinylnaphthalene, 4-methylstyrene, 2,4-dimethylstyrene, 3-ethylstyrene, 2,5-diethylstyrene, 2-methoxystyrene, 4-methoxy-3-methylstyrene, 4-chlorostyrene, 3,4-dimethylalphamethylstyrene, 3-bromo-4-methyl-alpha-methylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1,4-dihydroxystyrene, 3-nitrostyrene, 2-aminostyrene, 4-N,N-dimethylaminostyrene, 4-phenylstyrene, 4-chloro-1-vinylnaphthalene, acrylic acid, methacrylic acid, acrolein, methacrolein, acrylonitrile, methacrylonitrile, acrylamide, methacrylamide, methyl acrylate, methyl methacrylate, norbornenyl acrylate, norbornyl diacrylate, 2-hydroxyethyl acrylate, 2-phenoxyethyl acrylate, trimethoxysilyloxypropyl acrylate, dicyclopentenyl acrylate, cyclohexyl acrylate, 2-tolyloxyethyl acrylate, N,N-dimethylacrylamide, isopropyl methacrylate, ethyl acrylate, methyl alpha-chloroacrylate, beta-dimethylaminoethyl methacrylate, N-methyl methacrylamide, ethyl methacrylate, 2-ethylhexyl acrylate, neopentyl glycol diacrylate, cyclohexyl methacrylate, hexyl methacrylate, 2-methylcyclohexyl methacrylate, beta-bromoethyl methacrylate, benzyl methacrylate, phenyl methacrylate, neopentyl methacrylate, butyl methacrylate, chloroacrylic acid methyl chloro acrylic acid, hexyl acrylate, dodecyl acrylate, 3-methyl-1-butyl acrylate, 2-ethoxyethyl acrylate, phenyl acrylate, butoxyethoxyethyl acrylate, 2-methoxyethyl acrylate, isodecyl acrylate, pentaerythritol triacrylate, methoxy poly(ethyleneoxy)$_{12}$ acrylate, tridecoxy poly(ethyleneoxy)$_{12}$ acrylate, chloroacrylonitrile, dichloroisopropyl acrylate, ethacrylonitrile, N-phenyl acrylamide, N,N-diethylacrylamide, N-cyclohexyl acrylamide, vinyl acetate, vinyl propionate, vinyl butyrate, vinyl benzoate, vinyl butyral, vinyl chloroacetate, vinyl formate, vinyl methoxyacetate, vinyl caproate, vinyl oleate, vinyl adipate, methyl vinyl ketone, methyl isopropenyl ketone, phenyl ketone, methyl alpha-chlorovinyl ketone, ethyl vinyl ketone, divinyl ketone, hydroxymethyl vinyl ketone, chloromethyl vinyl ketone, allilydene diacetate, methyl vinyl ether, isopropyl vinyl ether, butyl vinyl ethers, 2-ethylhexyl vinyl ether, 2-methoxyethyl vinyl ether, 2-chloroethyl vinyl ether, methoxyethoxy ethyl vinyl ether, hydroxyethyl vinyl ether, aminoethyl vinyl ether, alpha-methylvinyl methyl ether, divinyl ether, divinyl ether of ethylene glycol or diethylene glycol or triethanolamine, cyclohexyl vinyl ether, benzyl vinyl ether, phenethyl vinyl ether, cresyl vinyl ether, hydroxyphenyl vinyl ether, chlorophenyl vinyl ether, napthyl vinyl ether, dimethyl maleate, diethyl maleate, di(2-ethylhexyl) maleate, dimethyl fumarate, dipropyl fumarate, diamyl fumarate, vinyl ethyl sulfide, divinyl sulfide, vinyl p-tolyl sulfide, divinyl sulfone, vinyl ethyl sulfone, vinyl ethyl sulfoxide, vinyl sulfonic acid, sodium vinyl sulfonate, vinyl sulfonamide, vinyl benzamide, vinyl pyridine, N-vinyl pyrollidone, N-vinyl carbazole, N-(vinyl benzyl)-pyrrolidine, N-(vinyl benzyl) piperidine, 1-vinyl pyrene, 2-isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, and the like.

The concentration of polycaprolactone polyol/maleic anhydride adduct mixture used in the copolymerization reaction mixture is from 10 to 97 weight percent, preferably from 15 to 90 weight percent. The concentration of ethylenically unsaturated monomers copolymerizable therewith present in the mixture is, therefore, from 3 to 90 weight percent, preferably from 10 to 85 weight percent.

The copolymerization is carried out at a temperature of from about 10° to 200° C., preferably from 20° to 150° C. Any of the known free radical initiators can be used in the conventional manner and at the conventional concentrations. Illustrative thereof one can mention hydrogen peroxide, peracetic acid, t-butyl hydroperoxide, di-t-butyl peroxide, dibenzoyl peroxide, benzoyl hydroperoxide, 2,4-dichlorobenzoyl peroxide, 2,5-dimethyl-2,5-bis(hydroperoxy)hexane, perbenzoic acid, t-butyl peroxypivalate, t-butyl perbenzoate, t-butyl peracetate, azo-bis-isobutyronitrile, sodium persulfate, and the like.

One can also have present an inert solvent which does not interfere with the polymerization.

In a typical embodiment, a polycaprolactone is initially reacted with maleic anhydride to produce the adduct mixture. This adduct mixture is then copolymerized with a copolymerizable ethylenically unsaturated monomer to produce the polymers of this invention.

The polymers can be used per se as coatings, sealants or for producing shaped molded articles. They can also be formulated to produce coating compositions that can be further modified in known manner by the addition of pigments, fillers and other additives conventionally added to coating compositions. In addition, solvents can be present, if desired. In any instance the coating compositions are applied to a surface by conventional means and then thermally cured either alone or in the presence of a crosslinker. It is preferred, however, to have a crosslinker present and in such instances the known catalyst for expediting the crosslinking reaction are generally added. The particular pigment or colorants added to the coating compositions are immaterial and any of the known conventional ones can be used. The amount of crosslinker present in the coating composition can vary from 25 to 200 weight percent, preferably 50 to 100 weight percent, based on the weight of the adduct present. Among the suitable crosslinkers are the urea formaldehyde aminoplasts, the hexamethoxymethyl melamines, and the known water dispersible transethers thereof with lower alkanols, benzoguanamine, acrylamide resins, epoxides and polyepoxides as well as any of the other well known crosslinkers of the amine or epoxide types. Suitable epoxides are those disclosed in U.S. Pat. Nos. 3,027,357, 2,890,194 and 2,890,197.

Catalysts are generally present to catalyze the epoxide, melamine or amine cure system and these are also well known. Among the common catalysts are the mineral acids such as hydrochloric acid or sulfuric acid, para-toluene sulfonic acid, dodecylbenzene sulphonic acid, phosphoric acid, maleic acid, trimelletic acid, phthalic acid, succinic acid, and the like. Also useful are the half esters of the anhydrides of said acids. It is known that the stronger the acidity, the better the catalytic activity. The conventional catalysts, such as the Lewis acids or stannous octoate, can also be used to catalyze the epoxide crosslinkers.

The coating compositions of this invention are applied to a substrate by the known conventional methods. They are cured by heating at a temperature of about 75° C. to 200° C., preferably from 90° C. to 175° C. for a period of time sufficient to obtain a dry film. Generally, this time will range from about 1 to 30 minutes, preferably from 10 to 20 minutes. The components present in a particular coating composition used will determine the temperature and time that will be required to obtain an adequate cure and a good film coating.

The coatings compositions were evaluated according to the following procedures. Crosshatch adhesion refers to a test using 10 parallel single edge razor blades to scribe test films with 2 sets of perpendicular lines on a crosshatch pattern. Ratings are based on the amount of film removed after applying and subsequently pulling a contact adhesive tape (Scotch Brand 606 ®) away from the surface of the scribed coating at a 90° angle in a fast rapid movement. It is important to carefully apply and press the tape to the scribed coating to eliminate air bubbles and provide a good bond because adhesion is reported in percent of film remaining on the substrate with a 100 percent rating indicating complete adhesion of the film to the substrate.

Solvent resistance is a measure of the resistance of the cured film to attack by acetone and is reported in the number of rubs or cycles of the acetone soaked cheesecloth required to remove one half of a film from the test area. The test is performed by stroking the film with an acetone soaked cheesecloth until that amount of film coating is removed. The number of complete cycles required to remove this amount of coating is a measure of the coating solvent resistance and the test is stopped after 100 rubs.

Reverse impact measures the ability of a given film to resist rupture from a falling weight. A Gardner Impact Tester using an eight pound dart is used to test the films cast and cured on the steel panel. The dart is raised to a given height in inches and dropped on to the reverse side of a coating metal panel. The inches multiplied by pounds, designated inch-pound, absorbed by the film without rupturing is recorded as the films reverse-impact resistance.

Pencil hardness is determined by ASTM D3363-74.

In this application the following definitions describe the particular compounds that are used in the examples:

Silicone Surfactant I is

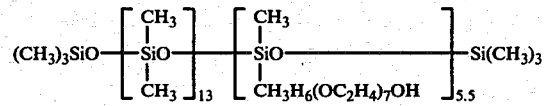

Polyol A is a polycaprolactone diol having a number average molecular weight of 530 and an average hydroxyl number, measured in milligrams of potassium hydroxide per gram, of 212.

Polyol B is a polycaprolactone triol having an average molecular weight of 540 and an average hydroxyl number of 310.

Polyol C is a polycaprolactone triol having an average molecular weight of 300 and an average hydroxyl number of 560.

Polyol D is a polycaprolactone triol having an average molecular weight of 900 and an average hydroxyl number of 187.

Polyol E is a polycaprolactone homopolymer having an average molecular weight of about 5,000.

Polyol F is a polycaprolactone homopolymer having an average molecular weight of about 10,000.

Polyol G is a polycaprolactone homopolymer having an average molecular weight of about 20,000.

Polyol H is a polycaprolactone diol having an average molecular weight of 2,000 and an average hydroxyl number of 56.

The following examples serve to further illustrate the invention; unless otherwise indicated, parts are by weight.

EXAMPLE 1

There were charged to a reactor 183 grams of Polyol C, 183 grams of Polyol B and 34 grams of maleic anhydride. The mixture was heated and stirred under an inert gas atmosphere to a temperature of 130° C. and then maintained at that temperature for 5 minutes. There was produced the polycaprolactone polyol/maleic anhydride adduct mixture which was an amber liquid.

The polycaprolactone polyol/maleic anhydride adduct was copolymerized with styrene by the dropwise addition of a mixture of 36 grams of styrene and 1.8 grams of t-butyl perbenzoate over a period of 15 minutes at 130° C. An additional 0.5 gram of t-butyl perbenzoate was added and the mixture was reacted for another 15 minutes at 130° C. The resulting polymer was a liquid having an acid number of 44 mgm. of KOH/gm; it was water insoluble. The polymer was converted to its water soluble form by neutralization with 28.8 grams of N,N-dimethylethanolamine and then formulated compositions were prepared containing the following components:

| Formulation | A | B | C |
|---|---|---|---|
| Product of Ex. 1, g. | 10 | 10 | 10 |
| Hexamethoxymethylmelamine, g. | 7.5 | 10 | 12.5 |
| Butoxyethyl acetate, g. | 3 | 3 | 3 |
| Silicone Surfactant, I, g. | 0.1 | 0.1 | 0.1 |
| Water, g. | 6.7 | 6.7 | 6.7 |

The formulated compositions were applied to steel panels using a No. 60 wire wound rod and cured, were heated for 20 minutes at 200° F. and no cure was observed. They were then cured to dry films by further heating for 20 minutes at 350° F. In all instances clear, dry, smooth films were obtained having the following properties:

| Formulation | A | B | C |
|---|---|---|---|
| Reverse impact, in-lb. | 50 | 200 | 200 |
| Pencil hardness | 2H | 2H | 2H |
| Crosshatch adhesion, % | 100 | 100 | 100 |
| Acetone resistance, cycles | >100 | >100 | >100 |

EXAMPLE 3

Following a procedure similar to that described in Example 1 a polycaprolactone polyol/maleic anhydride adduct mixture was produced by the reaction of 183 grams of Polyol C, 183 grams of Polyol B and 34 grams of maleic anhydride at 130° C. This product was a viscous liquid. A 50 grams portion was removed and set aside. (Cut A).

To the remainder of the above liquid adduct mixture there were added 30 grams of phthalic anhydride and the mixture was stirred at 130° C. for 20 minutes. A 40 grams portion was removed (Cut B). To the remainder a mixture of 29 grams of styrene and 10 grams of t-butyl peroxybenzoate was added dropwise over a 15 minute period at 130° C. and then stirred for 10 minutes. The product was a gel (Cut C).

A formulated composition was prepared containing 10 grams of Cut A, above, 10 grams of the water soluble polymer of Example 1, 10 grams of hexamethoxymethylmelamine, 3 grams of butoxyethyl acetate, 0.1 gram of Silicone Surfactant I and 6.7 grams of water. This formulated composition was applied and cured as described in Example 1 to yield a clear, smooth, dry film coating having a reverse impact of 225 in-lb., pencil hardness of 4H, crosshatch adhesion of 100 percent and acetone resistance greater than 100 cycles.

EXAMPLE 3

A series of polycaprolactone polyol/maleic anhydride adduct mixtures was prepared by the reaction of the amounts of components shown below at 100° to 130° C. for 30 minutes:

| Adduct | I | II | III | IV | V | VI | VII |
|---|---|---|---|---|---|---|---|
| Polyol used | C | D | A | H | E | F | G |
| g used | 207.2 | 305.3 | 296 | 365.9 | 192.8 | 29 | 99.1 |
| Maleic anhydride, g. | 192.8 | 94.7 | 104 | 34.1 | 7.2 | 0.53 | 0.9 |

In each instance the adduct was a viscous product completely soluble in benzene.

Ten grams of each of the above adducts was polymerized by reaction with styrene using the quantity of a 50 percent solution of benzoyl peroxide in 1,4-dioxane indicated below as catalyst. Polymerization for 30 minutes at 200° F. in 1 ounce vials gave solid styrene modified polymers that were recovered from the vials by breaking away the glass. The concentrations of reactant used were:

| Adduct | I | II | III | IV | V | VI | VII |
|---|---|---|---|---|---|---|---|
| Styrene, g. | 5 | 2.55 | 2.76 | 0.9 | 3.8 | 1.9 | 0.96 |
| Catalyst, g. | 0.3 | 0.26 | 0.26 | 0.22 | 0.14 | 0.12 | 0.11 |

The degree of insolubility of each polymer was determined by placing weighed portions of each polymer in benzene and allowing to stand for 1 week at room temperature. After 1 week the benzene was decanted, the samples dried and reweighed. Complete solubility implies a low density of crosslinks in the polymer molecule. The percent insolubles of the polymers produced were:

| Adduct/Styrene Copolymer of | Percent Insolubles |
|---|---|
| I | 100 |
| II | 93 |
| III | 87 |
| IV | 67 |
| V | 71 |
| VI | 0 |
| VII | 0 |

In this series, the 1 mole of styrene was reacted per equivalent maleate group present in the adduct molecule.

EXAMPLE 4

A second series of styrene modified copolymers was prepared as described in Example 3 using the same benzene soluble polycaprolactone polyol/maleic anhydride adduct mixtures produced therein. These were then polymerized with styrene using 5 moles of styrene per equivalent maleate moiety present in the adduct molecule. The amounts of each reactant used are tabulated below; as is the degree of insolubility of each copolymer produced.

| Adduct | I | II | III | IV | V | VI | VII |
|---|---|---|---|---|---|---|---|
| Adduct, g. | 3.3 | 5 | 5 | 10 | 5 | 5 | 10 |
| Styrene, g. | 8.5 | 6.4 | 6.9 | 4.5 | 9.55 | 4.8 | 4.8 |
| Catalyst, g. | 0.24 | 0.22 | 0.24 | 0.3 | 0.15 | 0.1 | 0.15 |
| Degree of insolubility, % | — | 97 | 92 | 75 | 0 | 0 | 0 |

A similar composition was produced using Adduct IV and a 1/1 weight ratio mixture of styrene and methyl methacrylate instead of styrene alone. A hard, white polymer was produced that had a 67% degree of insolubility.

EXAMPLE 5

A third series of styrene modified copolymers was prepared as described in Example 3 using the same benzene soluble polycaprolactone polyol/maleic anhydride adduct mixtures produced therein. These were then polymerized with 10 moles of styrene per equivalent maleate moiety present in the adduct molecule. The amounts of each reactant used are tabulated below; as is the degree of insolubility of each copolymer produced:

| Adduct | I | II | III | IV | V | VI | VII |
|---|---|---|---|---|---|---|---|
| Adduct, g. | 2 | 3.3 | 3.3 | 5 | 0.95 | 5 | 5 |
| Styrene, g. | 10.2 | 8.5 | 9.2 | 4.5 | 9.5 | 9.5 | 4.8 |
| Catalyst, g. | 0.24 | 0.24 | 0.26 | 0.2 | 0.1 | 0.15 | 0.1 |
| Degree of insolubility, % | — | 82 | 84 | 80 | 0 | 0 | 0 |

The data in Examples 3 to 5 shows that high crosslink densities can be obtained with a maleic anhydride concentration as low as 3.6 weight percent of the polycaprolactone polyol when copolymerizing with styrene. Generally most of the polymers were relatively hard. Low levels of styrene promoted hardness and clarity and as the styrene concentration was increased, the polymers produced became softer, more pliable and often cloudy.

EXAMPLE 6

A polycaprolactone polyol/maleic anhydride adduct mixture was produced as described in Example 1 using 305.3 grams of Polyol D and 94.7 grams of maleic anhydride. In this example the adduct was not neutralized; it was a viscous liquid.

A series of styrene modified polymers was produced by reacting the above adduct in admixture with styrene and with 3,4-epoxycyclohexylmethyl 3,4-epoxycyclohexanoate at 200° F. for 60 minutes using benzoyl peroxide and stannous octoate as catalysts. All of the polymers were clear and light amber in color; polymer I was hard, polymer II was softer but still relatively hard and polymer III was soft and rubbery. The amounts of reactants charged are shown below:

| Polymer | I | II | III |
|---|---|---|---|
| Adduct, g | 10 | 5 | 3.3 |
| Styrene, g | 2.55 | 6.4 | 8.5 |
| Diepoxide, g | 6.6 | 3.3 | 2.2 |
| Benzoyl peroxide, g | 0.19 | 0.15 | 0.14 |
| Stannous octoate, g | 0.19 | 0.15 | 0.14 |

What we claim is:

1. A polymer comprising (A) from 10 to 97 weight percent of the reaction product mixture of a polycaprolactone polyol and maleic anhydride and (B) from 3 to 90 weight percent of an ethylenically unsaturated monomer polymerized with (A); wherein said reaction product mixture (A) is the adduct of a polycaprolactone polyol having at least two hydroxyl groups in the molecule, a hydroxyl number of from 4 to 600 and an average molecular weight of from 290 to 25,000 with from 0.1 to 1 anhydride equivalent per hydroxyl equivalent in said polyol initially charged.

2. A polymer as claimed in claim 1, comprising (A) from 15 to 90 weight percent of the reaction product mixture of a polycaprolactone polyol and maleic anhydride and (B) from 10 to 85 weight percent of an ethylenically unsaturated monomer polymerized with (A).

3. A polymer as claimed in claim 1, wherein said component (A) is the reaction product of a polycaprolactone polyol having from 2 to 6 hydroxyl groups and maleic anhydride.

4. A polymer as claimed in claim 1, wherein said component (A) is the reaction product of a polycaprolactone polyol having from 2 to 4 hydroxyl groups and maleic anhydride.

5. A polymer as claimed in claim 1, wherein said component (A) is the adduct of a polycaprolactone diol having an average molecular weight of 530 and an average hydroxyl number of 212 with maleic anhydride and said component (B) is styrene.

6. A polymer as claimed in claim 1, wherein said component (A) is the adduct of a polycaprolactone triol having an average hydroxyl number of 310 with maleic anhydride and said component (B) is styrene.

7. A polymer as claimed in claim 1, wherein said component (A) is the adduct of a polycaprolactone triol having an average molecular weight of 300 and an average hydroxyl number of 560 with maleic anhydride and said component (B) is styrene.

8. A polymer as claimed in claim 1, wherein said component (A) is the adduct of a polycaprolactone triol having an average molecular weight of 900 and an average hydroxyl number of 187 with maleic anhydride and said component (B) is styrene.

9. A polymer as claimed in claim 1, wherein said component (A) is the adduct of a polycaprolactone homopolymer having an average molecular weight of about 5,000 with maleic anhydride and said component (B) is styrene.

10. A polymer as claimed in claim 1, wherein said component (A) is the adduct of a polycaprolactone homopolymer having an average molecular weight of about 10,000 with maleic anhydride and said component (B) is styrene.

11. A polymer as claimed in claim 1, wherein said component (A) is the adduct of a polycaprolactone homopolymer having an average molecular weight of about 20,000 with maleic anhydride and said component (B) is styrene.

12. A polymer as claimed in claim 1, wherein said component (A) is the adduct of a polycaprolactone diol having an average molecular weight of 2,000 and an average hydroxyl number of 56 with maleic anhydride and said component (B) is styrene.

13. A polymer as claimed in claim 1, additionally containing from 25 to 200 weight percent of a crosslinking agent based on the weight of said adduct present.

14. A polymer as claimed in claim 13, wherein said crosslinker is a melamine.

15. A polymer as claimed in claim 14, wherein said crosslinker is hexamethoxymethylmelamine.

16. A polymer as claimed in claim 13, wherein said crosslinker is a 1,2-epoxide.

17. A polymer as claimed in claim 16, wherein said crosslinker is 3,4-epoxycyclohexylmethyl 3,4-epoxycyclohexanoate.

* * * * *